(12) United States Patent
Gan et al.

(10) Patent No.: US 11,798,266 B2
(45) Date of Patent: Oct. 24, 2023

(54) MULTI-DIMENSIONAL TASK FACIAL BEAUTY PREDICTION METHOD AND SYSTEM, AND STORAGE MEDIUM

(71) Applicant: Wuyi University, Jiangmen (CN)

(72) Inventors: Junying Gan, Jiangmen (CN); Bicheng Wu, Jiangmen (CN); Yikui Zhai, Jiangmen (CN); Guohui He, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 246 days.

(21) Appl. No.: 17/424,403

(22) PCT Filed: Jul. 24, 2020

(86) PCT No.: PCT/CN2020/104560
§ 371 (c)(1),
(2) Date: Jul. 20, 2021

(87) PCT Pub. No.: WO2021/232582
PCT Pub. Date: Nov. 25, 2021

(65) Prior Publication Data
US 2022/0309770 A1 Sep. 29, 2022

(30) Foreign Application Priority Data
May 18, 2020 (CN) .......................... 202010423325.6

(51) Int. Cl.
*G06V 10/77* (2022.01)
*G06V 10/776* (2022.01)
(Continued)

(52) U.S. Cl.
CPC ............ *G06V 10/776* (2022.01); *G06V 10/40* (2022.01); *G06V 10/764* (2022.01);
(Continued)

(58) Field of Classification Search
CPC .... G06V 10/776; G06V 10/40; G06V 10/764; G06V 10/774; G06V 10/7784;
(Continued)

(56) References Cited

U.S. PATENT DOCUMENTS 8,041,082 B1  10/2011  Baluja et al.
11,126,826 B1 *  9/2021  Karakas ............... G06V 40/174
(Continued)

FOREIGN PATENT DOCUMENTS

CN  101305913 A  11/2008
CN  108280452 A  7/2018
(Continued)

*Primary Examiner* — Md K Talukder
(74) *Attorney, Agent, or Firm* — Vivacqua Crane, PLLC

(57) ABSTRACT

A multi-dimensional task facial beauty prediction method and system, and a storage medium are disclosed. The method includes the steps of: at a training phase, using first facial images to optimize a shared feature extraction network for extracting shared features and to train a plurality of sub-task networks for performing facial beauty classification tasks; at a testing phase, extracting shared features of second facial images; inputting the shared features to the trained plurality of sub-task networks; and obtaining a first beauty prediction result based on first output results of the plurality of sub-task networks.

15 Claims, 6 Drawing Sheets

S210  extract shared features of second facial images

S220  input the shared features of the second facial images to the trained plurality of sub-task networks S230  obtain a first beauty prediction result based on first output results of the plurality of sub-task networks

(51) Int. Cl.
  *G06V 20/70* (2022.01)
  *G06V 40/16* (2022.01)
  *G06V 10/40* (2022.01)
  *G06V 10/94* (2022.01)
  *G06V 10/778* (2022.01)
  *G06V 10/774* (2022.01)
  *G06V 10/764* (2022.01)
(52) U.S. Cl.
  CPC ........ *G06V 10/774* (2022.01); *G06V 10/7784* (2022.01); *G06V 10/95* (2022.01); *G06V 20/70* (2022.01); *G06V 40/168* (2022.01)
(58) Field of Classification Search
  CPC ...... G06V 10/95; G06V 20/70; G06V 40/168; G06V 10/82; G06F 18/214; G06F 18/241; G06N 3/045; G06N 3/084
  See application file for complete search history.

(56) References Cited

U.S. PATENT DOCUMENTS

| | | | |
|---|---|---|---|
| 2003/0110147 A1* | 6/2003 | Li | G06F 18/214 706/1 |
| 2017/0076474 A1* | 3/2017 | Fu | G06T 11/00 |
| 2019/0370440 A1* | 12/2019 | Gu | G06N 3/048 |
| 2021/0303818 A1* | 9/2021 | Randolph | G06N 5/045 |
| 2022/0076000 A1* | 3/2022 | Yang | G06V 20/597 |
| 2022/0309770 A1* | 9/2022 | Gan | G06V 40/168 |

FOREIGN PATENT DOCUMENTS

| | | |
|---|---|---|
| CN | 108960087 A | 12/2018 |
| CN | 109165674 A | 1/2019 |
| CN | 110119689 A | 8/2019 |
| CN | 110414489 A | 11/2019 |

\* cited by examiner

AA shared feature extraction network
BA sub-task network 1
BB sub-task network 2
BC sub-task network 3
CC prediction result output network S110 use first facial images to optimize a shared feature extraction network for extracting shared features and to train a plurality of sub-task networks for performing facial beauty classification tasks S210 extract shared features of second facial images S220 input the shared features of the second facial images to the trained plurality of sub-task networks S230 obtain a first beauty prediction result based on first output results of the plurality of sub-task networks S310 input third facial images marked with a facial beauty level label to a migration network S320 supervise the migration network by using the facial beauty level label, and optimize parameters of the shared feature layer and the classifier by using a back propagation algorithm S330 migrate the parameters of the shared feature layer to a network framework S410  input fourth facial images marked with a multi-dimensional label to the network framework after the training phase S420  collect error samples S430  re-input the error samples to the network framework, and optimize the parameters of each sub-task network in order

MULTI-DIMENSIONAL TASK FACIAL BEAUTY PREDICTION METHOD AND SYSTEM, AND STORAGE MEDIUM

CROSS-REFERENCE TO RELATED APPLICATIONS

This application is a national stage filing under 35 U.S.C. § 371 of international application number PCT/CN2020/104560, filed Jul. 24, 2020, which claims priority to Chinese patent application No. 2020104233256 filed May 18, 2020. The contents of these applications are incorporated herein by reference in their entirety.

TECHNICAL FIELD

The present disclosure relates to the field of neural networks, in particular to a multi-dimensional task facial beauty prediction method and system, and a storage medium.

BACKGROUND

In facial beauty prediction, there is always a problem of imbalanced data samples as people with ordinary appearance are always more than those with a high or low appearance level in reality. The imbalance of data samples causes a classifier to be skewing towards majority class samples, which makes the classifier not effective in classifying minority class samples and increases the average classification cost of the overall data samples.

SUMMARY

The present disclosure aims to resolve at least one of technical problems in existing technology by providing a multi-dimensional task facial beauty prediction method and system, and a storage medium.

The technical solutions adopted by the present disclosure to resolve the problems are described as follows.

According to a first aspect of the present disclosure, a multi-dimensional task facial beauty prediction method is provided including the following steps of:

at a training phase:

using first facial images to optimize a shared feature extraction network for extracting shared features and to train a plurality of sub-task networks for performing facial beauty classification tasks, wherein the first facial images are marked with a multi-dimensional label for reflecting a facial beauty level, the multi-dimensional label is used to supervise the shared feature extraction network, and each dimension of the multi-dimensional label is used to supervise a respective one of the sub-task networks; and at a testing phase:

extracting shared features of second facial images via the trained shared feature extraction network;

inputting the shared features of the second facial images to the trained plurality of sub-task networks; and obtaining a first beauty prediction result based on first output results of the plurality of sub-task networks.

According to the first aspect of the present disclosure, the method further includes, before the training phase:

at a parameter migration phase:

inputting third facial images marked with a facial beauty level label to a migration network, wherein the migration network includes a shared feature layer and a classifier;

supervising the migration network by using the facial beauty level label, and optimizing parameters of the shared feature layer and the classifier by using a back propagation algorithm; and migrating the parameters of the shared feature layer to a network framework including the shared feature extraction network and the plurality of sub-task networks.

According to the first aspect of the present disclosure, the method further includes, before the testing phase:

at a verification phase:

inputting fourth facial images marked with the multi-dimensional label to the network framework after the training phase;

collecting error samples, wherein the error samples are the fourth facial images corresponding to classification errors of the sub-task networks; and re-inputting the error samples to the network framework, and optimizing the parameters of each of the sub-task networks in order.

According to the first aspect of the present disclosure, supervision of each dimension of the multi-dimensional label on a respective one of the sub-task networks includes: determining whether a second output result outputted by the respective one of the sub-task networks is the same as the each dimension of the multi-dimensional label; and calculating a cost value.

According to the first aspect of the present disclosure, a k-th dimension of the multi-dimensional label of a i-th first facial image is represented as:

$$y_i^{(k)} = \begin{cases} 1, k < yi \\ 0, k \geq yi \end{cases},$$

wherein $yi \in \{1, 2 \ldots K, K+1\}$, $k \in \{1, 2, 3 \ldots K\}$, and K is a total number of dimensions of the multi-dimensional label; during supervising, the cost value of the sub-task networks is shown as:

$$\mathrm{cost}_k(y_i) = \begin{cases} k - yi + 1, yi \leq k \\ yi - k, yi > k \end{cases};$$

the cost-sensitive loss function of the sub-task networks is: $L_k = -\cos\, t_k(y_i)(y_i^{(k)} \log\, \sigma(W^{(k)^y} X_i) + (1 - y_i^{(k)}) \log(1 - \sigma(W^{(k)^y} X_i)))$, wherein $W^{(k)}$ is a parameter of the facial beauty classification tasks, and $\sigma(X)$ represents a sigmoid function.

According to the first aspect of the present disclosure, the method further includes:

at the training phase:

cyclically optimizing parameters of each sub-task network in order by using a back propagation algorithm.

According to the first aspect of the present disclosure, the method further includes:

optimizing parameters of the shared feature extraction network each time the parameters of one sub-task network are optimized.

According to the first aspect of the present disclosure, obtaining a first beauty prediction result based on first output results of the plurality of sub-task networks includes:

converting the first output results of the plurality of sub-task networks into an integrated result in the same form as the multi-dimensional label;

comparing the integrated result with the multi-dimensional label to determine whether the integrated result is wrong;

using the facial beauty level corresponding to the integrated result as the first beauty prediction result if the integrated result corresponds to the multi-dimensional label; and correcting the integrated result according to the first output results if the integrated result does not correspond to the multi-dimensional label, and using the facial beauty level corresponding to the corrected integrated result as the first beauty prediction result.

According to a second aspect of the present disclosure, a multi-dimensional task facial beauty prediction system using the multi-dimensional task facial beauty prediction method according to the first aspect of the present disclosure is provided, including:

the shared feature extraction network, configured to extract the shared features of the first facial images at the training phase and the shared features of the second facial images at the testing phase, wherein the first facial images are marked with the multi-dimensional label for reflecting the facial beauty level, and each dimension of the multi-dimensional label is of a Boolean type;

the plurality of sub-task networks, each sub-task network configured to perform a respective one of the facial beauty classification tasks, and each dimension of the multi-dimensional label is used to supervise a respective one of the facial beauty classification task; and a prediction result output network, configured to obtain the first beauty prediction result based on the first output results of the plurality of sub-task networks.

According to a third aspect of the present disclosure, a storage medium is provided storing executable instructions which, when executed by a computer, cause the computer to perform the multi-dimensional task facial beauty prediction method according to the first aspect of the present disclosure.

The above solutions at least have the following beneficial effects: a single prediction task is split into the multiple facial beauty classification tasks, and multi-task prediction learning is performed by using single-task data. At the training phase, each facial beauty classification task is supervised by using the multi-dimensional label to optimize parameters. At the testing phase, the first beauty prediction result is obtained based on the first output results of the multiple facial beauty classification tasks, which can effectively resolve the problem of imbalance of the data samples during facial beauty prediction and improve the accuracy of facial beauty prediction.

Additional aspects and advantages of the present disclosure will be set forth in part in the description that follows, and, in part, will be obvious from the description, or may be learned by practice of the present disclosure.

BRIEF DESCRIPTION OF DRAWINGS

The present disclosure will be further explained hereinafter with reference to the accompanying drawings and exemplary embodiments.

DETAILED DESCRIPTION

Specific embodiments of the present disclosure will be described in detail in this section, the preferred embodiments of the present disclosure are illustrated in the accompanying drawings, and the accompanying drawings serve as a supplement to the literal description of the Specification so that a person can intuitively and vividly understand each technical feature and overall technical solutions of the present disclosure, but shall not be understood as limitations to the scope of the present disclosure.

In description of the present disclosure, "several" means one or more, and "a plurality of" means at least two; "more than", "less than", and "exceed" and the like shall not be construed as including the number itself; and "above", "below", "within" and the like shall be construed as including the number itself "First" and "second" in description shall be construed as distinguishing between the technical features, and shall not be construed as indicating or implying relative importance or implicitly indicating the number of the technical features indicated or implicitly indicating the sequence relationship of the indicated technical features.

In the description of the present disclosure, unless otherwise specified, the terms such as "provided", "mounted" and "connected" should be understood in a broad sense, and the specific meanings of the terms in the present disclosure can be reasonably determined by those having ordinary skill in the art in light of the specific contents of the technical solutions.

Figure 2:
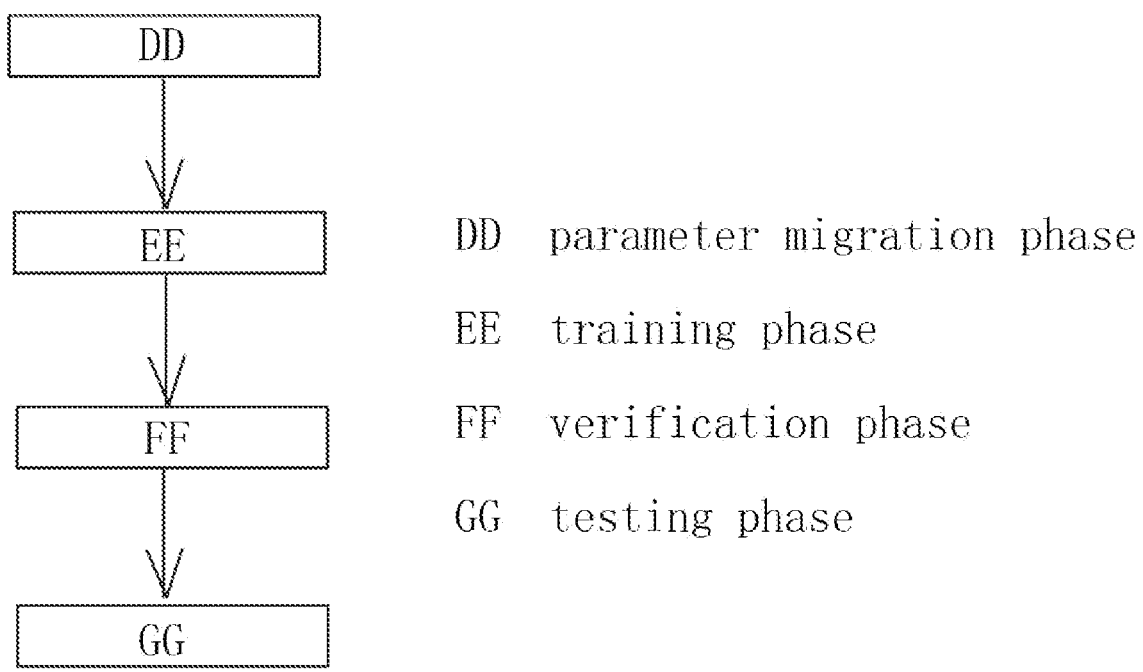
FIG. 2 is an overall flow chart of a multi-dimensional task facial beauty prediction method according to an embodiment of the present disclosure.
Figure 3:
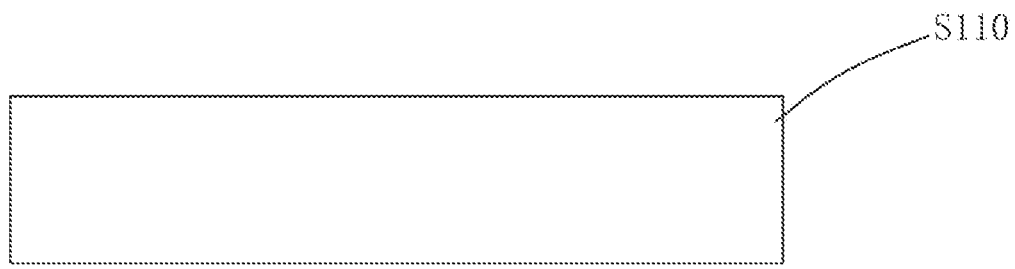
FIG. 3 is a flow chart of a training phase of the multi-dimensional task beauty prediction method according to an embodiment of the present disclosure.
Figure 4:
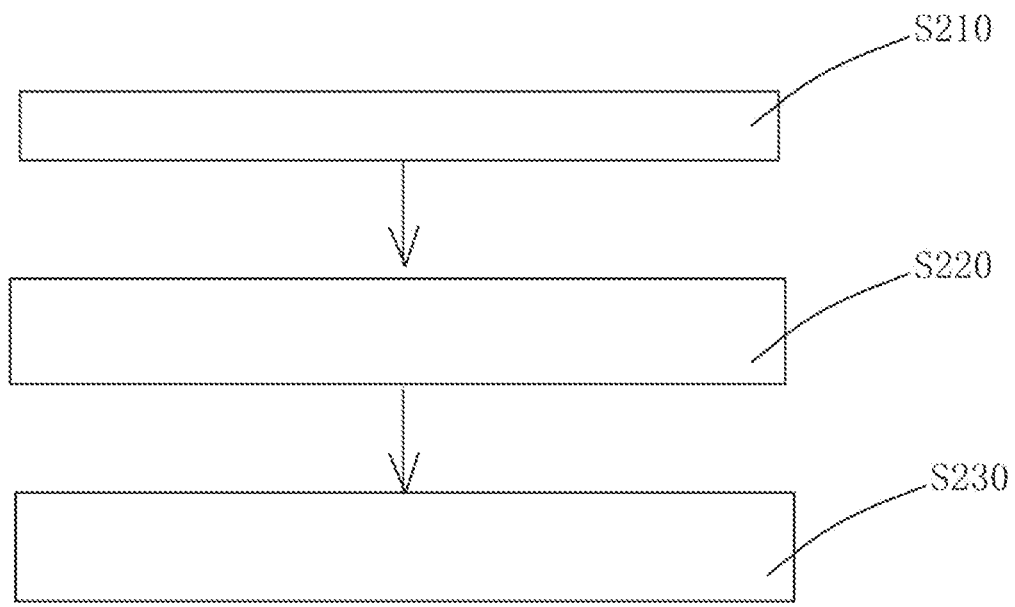
FIG. 4 is a flow chart of a testing phase of the multi-dimensional task facial beauty prediction method according to an embodiment of the present disclosure.

Referring to FIGS. 2, 3 and 4, some embodiments of the present disclosure provide a multi-dimensional task facial beauty prediction method, including the following steps:

at a training phase:

step S110: using first facial images to optimize a shared feature extraction network 10 for extracting shared features and to train a plurality of sub-task networks 20 for performing facial beauty classification tasks, where the first facial images are marked with multi-dimensional label for reflecting a facial beauty level, the multi-dimensional label is used to supervise the shared feature extraction network 10, and each dimension of the multi-dimensional label is used to supervise a respective one of the sub-task networks 20;

at a testing phase:

step S210: extracting shared features of second facial images via the trained shared feature extraction network 10;

step S220: inputting the shared features of the second facial images to the trained plurality of sub-task networks 20; and step S230: obtaining a first beauty prediction result based on first output results of the plurality of sub-task networks 20.

In the embodiment, a single prediction task is split into multiple facial beauty classification tasks, and multi-task prediction learning is performed by using single-task data. At the training phase, the shared feature extraction network 10 is supervised by using the entire multi-dimensional label to optimize parameters, and each sub-task network 20 is supervised by using each dimension of the multi-dimensional label to optimize parameters. At the testing phase, the first beauty prediction result is obtained based on the first output results of the plurality of sub-task networks 20, which can effectively resolve the problem of imbalance of data samples during facial beauty prediction and improve the accuracy of facial beauty prediction.

The correlation among the facial beauty classification tasks is retained in the form of shared features, and each facial beauty classification task is more specialized. The multi-dimensional label used to reflect facial beauty levels are split in a sorting manner for multi-task optimization, and this idea is similar to the practice that human cranial nerves split a thing into a plurality of parts/steps for respective resolving and the parts/steps have correlation, so that the networks have a stronger generalization ability.

Specifically, both the shared feature extraction network and the sub-task networks adopt a convolutional neural network (CNN) model structure.

Figure 5:
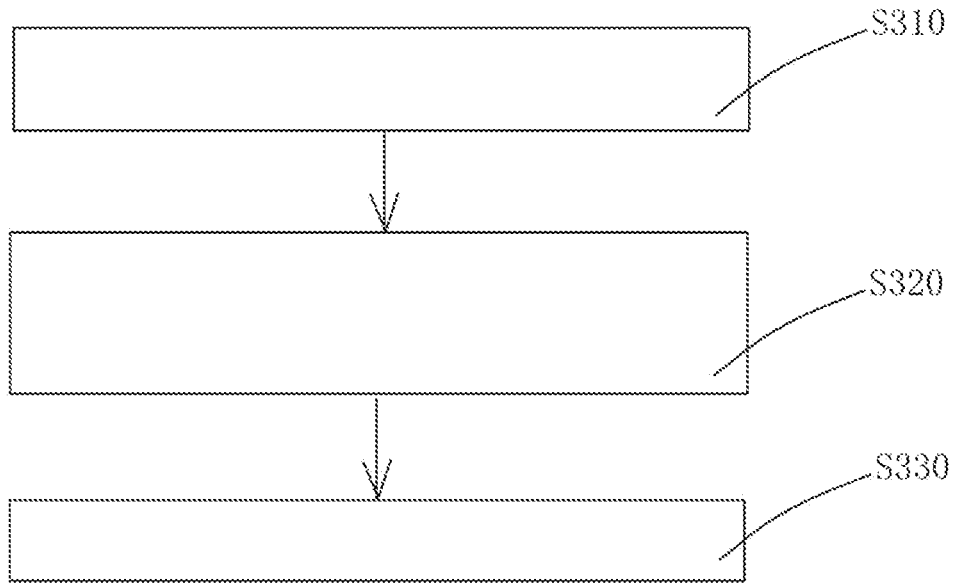
FIG. 5 is a flow chart of a parameter migration phase of the multi-dimensional task facial beauty prediction method according to an embodiment of the present disclosure.

Referring to FIGS. 2 and 5, in addition, the multi-dimensional task facial beauty prediction method further includes, before the training phase:

at a parameter migration phase:

step S310: inputting third facial images marked with a facial beauty level label to a migration network, where the migration network includes a shared feature layer and a classifier; the shared feature layer has the same structure as the shared feature extraction network 10; the facial beauty level labels are directly expressed in a constant form, such as 1, 2, and 3; and the third facial images use the same image set as the first facial images;

step S320: supervising the migration network by using the facial beauty level label, and optimizing parameters of the shared feature layer and the classifier by using a back propagation algorithm; and step S330: migrating the parameters of the shared feature layer to a network framework including the shared feature extraction network 10 and the plurality of sub-task networks 20.

Figure 6:
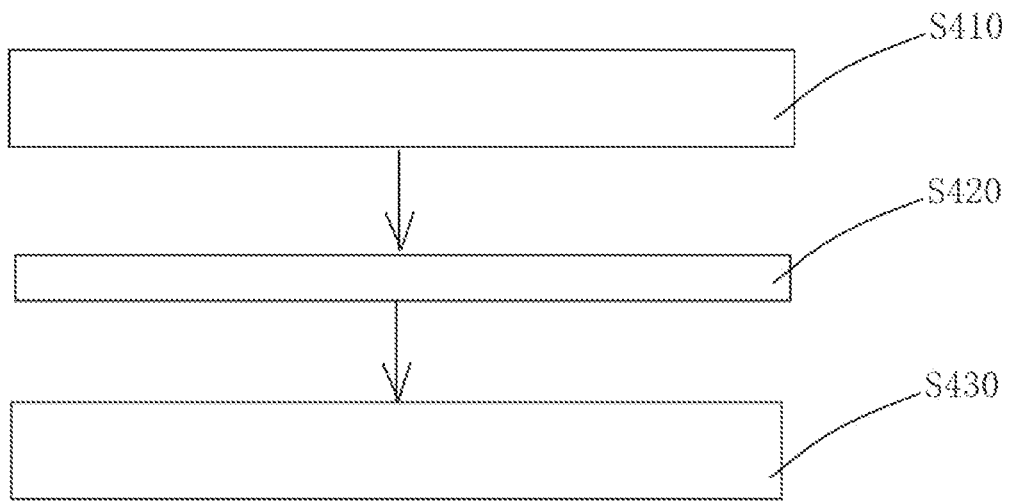
FIG. 6 is a flow chart of a verification phase of the multi-dimensional task facial beauty prediction method according to an embodiment of the present disclosure.

Referring to FIGS. 2 and 6, in addition, the multi-dimensional task facial beauty prediction method further includes, before the testing phase:

at a verification phase:

step S410: inputting fourth facial images marked with multi-dimensional label to the network framework after the training phase, where the fourth facial images are not the first facial images;

step S420: collecting error samples, where the error samples are the fourth facial images corresponding to classification errors of the sub-task networks 20; and step S430: re-inputting the error samples to the network framework, and optimizing the parameters of each sub-task network 20 in order.

The verification phase can further improve the generalization ability of the networks.

In the step S110, supervision of each dimension of the multi-dimensional label on the respective one of the sub-task networks 20 specifically includes: determining whether a second output result outputted by one sub-task network 20 is the same as the corresponding dimension of the multi-dimensional label; and calculating a cost value. The multi-dimensional label plays a supervisory role. In the training process of the facial beauty classification tasks, if the classification is erroneous, there would cause an error to the label. The greater the classification error is, the higher the cost value is. If the classification is correct, the cost value is 0.

It should be noted that the first output results are values outputted by the sub-task networks 20 during the testing phase; and the second output results are values outputted by the sub-task networks 20 during the training phase.

Further, degrees of beauty of facials with the setting of (K+1) levels can be represented by a K-dimensional label. The k-th dimension of the multi-dimensional label of the i-th first facial image is expressed as $$y_i^{(k)} = \begin{cases} 1, k < yi \\ 0, k \geq yi \end{cases},$$

where $y_i$ is a facial beauty level corresponding to the three-dimensional label, $y_i \in \{1, 2 \ldots K, K+1\}$, $k \in \{1, 2, 3 \ldots K\}$, and K is a total number of dimensions of the multi-dimensional label. That is, for a three-dimensional label, the three-dimensional label corresponding to the facial beauty level $y_i$=1 is expressed as [0, 0, 0], the three-dimensional label corresponding to the facial beauty level $y_i$=2 is expressed as [1, 0, 0], and the three-dimensional label corresponding to the facial beauty level $y_i$=3 is expressed as [1, 1, 0].

Then, during supervising, the cost value of the sub-task networks 20 is specifically shown as in the formula:

$$\text{cost}_k(y_i) = \begin{cases} k - yi + 1, yi \leq k \\ yi - k, yi > k \end{cases};$$

a cost-sensitive loss function of the sub-task networks 20 can be shown as: $L_k = -\cos t_k(y_i)(y_i^{(k)} \log \sigma(W^{(k)^y}X_i) + (1-y_i^{(k)})\log(1-\sigma(W^{(k)^y}X_i)))$, where $W^{(k)}$ represents the parameter of the sub-task network 20, $\sigma(x)$ is a sigmoid function, and X is the i-th inputted facial image.

At the training phase, the parameters of each sub-task network 20 for performing the facial beauty classification task are cyclically optimized in order for the multiple facial beauty classification tasks by using the back propagation algorithm. This can prevent negative migration between the multiple facial beauty classification tasks, and enable the multiple facial beauty classification tasks to share the features as much as possible.

In addition, while the parameters of one sub-task network 20 are optimized each time, the parameters of the shared feature extraction network 10 for extracting the shared features of the first facial images are optimized.

At the testing phase, obtaining the first beauty prediction result based on the first output results of the plurality of sub-task networks 20 in the step S230 specifically includes: converting the first output results of the plurality of sub-task networks 20 into an integrated result in the same form as the multi-dimensional label; comparing the integrated result with the multi-dimensional label to determine whether the integrated result is wrong; if the integrated result is wrong, correcting the integrated result; and using the facial beauty level corresponding to the correct integrated result as the first beauty prediction result. It should be noted that the corrected integrated result is considered as correct integrated result, the integrated result that is determined to be correct is also correct integrated result, and the facial beauty level corresponding to both can be regarded as the first beauty prediction result.

Specifically, the first output results of the plurality of sub-task networks 20 are arranged in order to obtain the integrated result [a, b, c . . . ] in the same form as the multi-dimensional label.

In addition, if the integrated result is not the same as any multi-dimensional label, that is, the integrated result does not correspond to any multi-dimensional label, it is determined that the integrated result is wrong. For example, the multi-dimensional label includes [0, 0, 0], [1, 0, 0] and [1, 1, 0] corresponding to facial beauty levels 1, 2, and 3 respectively. If an integrated result is [0, 1, 0], the integrated result is wrong. The first element corresponds to the first facial beauty classification task, the second element corresponds to the second facial beauty classification task, and the third element corresponds to the third facial beauty classification task. Correction is performed based on the minimum number of erroneous facial beauty classification tasks, that is, if at least one number of the integrated result needs to be corrected to obtain a correct result corresponding to the multi-dimensional label, then only one number needs to be corrected. The element corresponding to the facial beauty classification task with lower confidence is selected for correction. Since the element is a Boolean element, 0 is corrected to 1, and 1 is corrected to 0.

Figure 1:
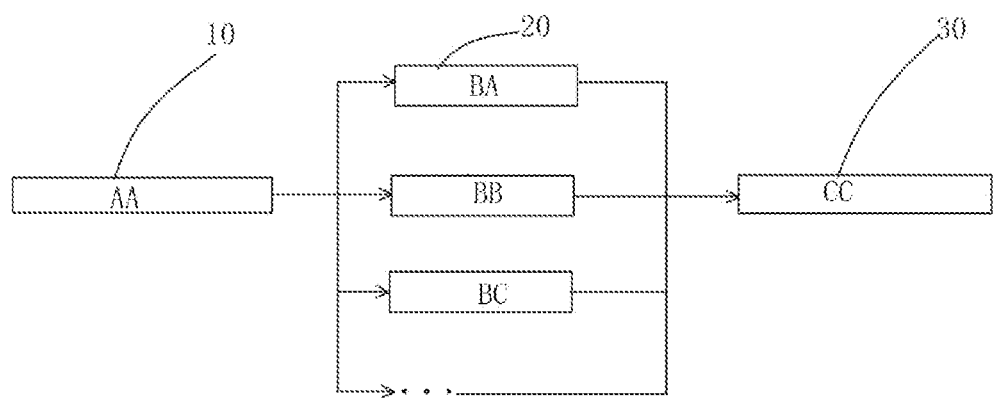
FIG. 1 is a structural view of a multi-dimensional task facial beauty prediction system according to an embodiment of the present disclosure.

Referring to FIG. 1, some embodiments of the present disclosure provide a multi-dimensional task facial beauty prediction system. The multi-dimensional task facial beauty prediction system uses the multi-dimensional task facial beauty prediction method in the method embodiments. The multi-dimensional task facial beauty prediction system includes:

a shared feature extraction network 10, configured to extract shared features of first facial images at a training phase, and to extract shared features of second facial images at a testing phase, where the first facial images are marked with a multi-dimensional label for reflecting a facial beauty level, and each dimension of the multi-dimensional label is of the Boolean type;

a plurality of sub-task networks 20, each configured to perform a facial beauty classification task, and each dimension of the multi-dimensional label is used to supervise a facial beauty classification task; and a prediction result output network 30, configured to obtain a first beauty prediction result based on first output results of the plurality of sub-task networks 20.

In the device embodiment, the multi-dimensional task facial beauty prediction system, which uses the multi-dimensional task facial beauty prediction method as described in the method embodiments, can perform each step of the facial beauty prediction method, and has the same technical effects as the facial beauty prediction method. Details are not described herein again.

Some embodiments of the present disclosure provide a storage medium storing executable instructions which, when executed by a computer, cause the computer to perform the multi-dimensional task facial beauty prediction method as described in the method embodiments.

Examples of the storage medium include, but are not limited to, a phase change random access memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storage, a magnetic cartridge tape, a tape disk storage or other magnetic storage devices or any other non-transmission media, which can be used to store information that can be accessed by a computing device.

The foregoing description provides only preferred embodiments of the present disclosure, and the present disclosure is not limited to the above-mentioned embodiments. Any embodiment achieving the same technical effects by the same means shall fall within the protection scope of the present disclosure.

What is claimed is:

1. A multi-dimensional task facial beauty prediction method comprising the following steps:

at a training phase:

using first facial images to optimize a shared feature extraction network for extracting shared features and to train a plurality of sub-task networks for performing facial beauty classification tasks, wherein the first facial images are marked with a multi-dimensional label for reflecting a facial beauty level, the multi-dimensional label is used to supervise the shared feature extraction network, and each dimension of the multi-dimensional label is used to supervise a respective one of the sub-task networks; and at a testing phase:

extracting shared features of second facial images via the trained shared feature extraction network;

inputting the shared features of the second facial images to the trained plurality of sub-task networks; and obtaining a first beauty prediction result based on first output results of the plurality of sub-task networks;

wherein obtaining a first beauty prediction result based on first output results of the plurality of sub-task networks comprises:

converting the first output results of the plurality of sub-task networks into an integrated result in the same form as the multi-dimensional label;

comparing the integrated result with the multi-dimensional label to determine whether the integrated result is wrong;

using the facial beauty level corresponding to the integrated result as the first beauty prediction result if the integrated result corresponds to the multi-dimensional label; and correcting the integrated result according to the first output results if the integrated result does not correspond to the multi-dimensional label, and using the facial beauty level corresponding to the corrected integrated result as the first beauty prediction result.

2. The multi-dimensional task facial beauty prediction method of claim 1, further comprising, before the training phase:

at a parameter migration phase:

inputting third facial images marked with a facial beauty level label to a migration network, wherein the migration network comprises a shared feature layer and a classifier;

supervising the migration network by using the facial beauty level label, and optimizing parameters of the shared feature layer and the classifier by using a back propagation algorithm; and migrating the parameters of the shared feature layer to a network framework comprising the shared feature extraction network and the plurality of sub-task networks.

3. The multi-dimensional task facial beauty prediction method of claim 2, further comprising, before the testing phase:

at a verification phase:
  inputting fourth facial images marked with the multi-dimensional label to the network framework after the training phase;
  collecting error samples, wherein the error samples are the fourth facial images corresponding to classification errors of the sub-task networks; and
  re-inputting the error samples to the network framework, and optimizing the parameters of each of the sub-task networks in order.

4. The multi-dimensional task facial beauty prediction method of claim 1, wherein supervision of each dimension of the multi-dimensional label on a respective one of the sub-task networks comprises: determining whether a second output result outputted by the respective one of the sub-task networks is the same as the each dimension of the multi-dimensional label; and calculating a cost value.

5. The multi-dimensional task facial beauty prediction method of claim 4, wherein a k-th dimension of the multi-dimensional label of a i-th first facial image is represented as:

$$y_i^{(k)} = \begin{cases} 1, k < yi \\ 0, k \geq yi \end{cases}, y_i^{(k)} = \begin{cases} 1, k < yi \\ 0, k \geq yi \end{cases}$$

wherein $yi \in \{1, 2 \ldots K, K+1\}$, $k \in \{1, 2, 3 \ldots K\}$, and K is a total number of dimensions of the multi-dimensional label; during supervising, the cost value of the sub-task networks is shown as:

$$\text{cost}_k(y_i) = \begin{cases} k - yi + 1, yi \leq k \\ yi - k, yi > k \end{cases} \begin{cases} k - yi + 1, yi \leq k \\ yi - k, yi > k \end{cases};$$

the cost-sensitive loss function of the sub-task networks is: $L_k = -\cos t_k(y_i)(y_i^{(l)}\log \sigma(W^{(k)'}X_i) + (1-y_i^{(k)})\log(1-\sigma(W^{(k)'}X_i))$, wherein $W^{(k)}$ is a parameter of the facial beauty classification tasks, and $\sigma(x)$ represents a sigmoid function.

6. The multi-dimensional task facial beauty prediction method of claim 1, further comprising:
  at the training phase:
  cyclically optimizing parameters of each sub-task network in order by using a back propagation algorithm.

7. The multi-dimensional task facial beauty prediction method of claim 6, further comprising:
  optimizing parameters of the shared feature extraction network each time the parameters of one sub-task network are optimized.

8. A multi-dimensional task facial beauty prediction system using the multi-dimensional task facial beauty prediction method, wherein:
  the method comprises the following steps:
    at a training phase:
      using first facial images to optimize a shared feature extraction network for extracting shared features and to train a plurality of sub-task networks for performing facial beauty classification tasks, wherein the first facial images are marked with a multi-dimensional label for reflecting a facial beauty level, the multi-dimensional label is used to supervise the shared feature extraction network, and each dimension of the multi-dimensional label is used to supervise a respective one of the sub-task networks; and
    at a testing phase:
      extracting shared features of second facial images via the trained shared feature extraction network;
      inputting the shared features of the second facial images to the trained plurality of sub-task networks; and
      obtaining a first beauty prediction result based on first output results of the plurality of sub-task networks; and
  the system comprises:
    the shared feature extraction network, configured to extract the shared features of the first facial images at the training phase and the shared features of the second facial images at the testing phase, wherein the first facial images are marked with the multi-dimensional label for reflecting the facial beauty level, and each dimension of the multi-dimensional label is of a Boolean type;
    the plurality of sub-task networks, each sub-task network configured to perform a respective one of the facial beauty classification tasks, and each dimension of the multi-dimensional label is used to supervise a respective one of the facial beauty classification task; and
    a prediction result output network, configured to obtain the first beauty prediction result based on the first output results of the plurality of sub-task networks.

9. A non-transitory storage medium storing executable instructions which, when executed by a computer, cause the computer to perform the multi-dimensional task facial beauty prediction method comprising the following steps:
  at a training phase:
    using first facial images to optimize a shared feature extraction network for extracting shared features and to train a plurality of sub-task networks for performing facial beauty classification tasks, wherein the first facial images are marked with a multi-dimensional label for reflecting a facial beauty level, the multi-dimensional label is used to supervise the shared feature extraction network, and each dimension of the multi-dimensional label is used to supervise a respective one of the sub-task networks; and
  at a testing phase:
    extracting shared features of second facial images via the trained shared feature extraction network;
    inputting the shared features of the second facial images to the trained plurality of sub-task networks; and
    obtaining a first beauty prediction result based on first output results of the plurality of sub-task networks;
  wherein obtaining a first beauty prediction result based on first output results of the plurality of sub-task networks comprises:
    converting the first output results of the plurality of sub-task networks into an integrated result in the same form as the multi-dimensional label;
    comparing the integrated result with the multi-dimensional label to determine whether the integrated result is wrong;
    using the facial beauty level corresponding to the integrated result as the first beauty prediction result if the integrated result corresponds to the multi-dimensional label; and
    correcting the integrated result according to the first output results if the integrated result does not correspond to the multi-dimensional label, and using the facial beauty level corresponding to the corrected integrated result as the first beauty prediction result.

10. The non-transitory storage medium of claim 9, wherein the method further comprises, before the training phase:
   at a parameter migration phase:
   inputting third facial images marked with a facial beauty level label to a migration network, wherein the migration network comprises a shared feature layer and a classifier;
   supervising the migration network by using the facial beauty level label, and optimizing parameters of the shared feature layer and the classifier by using a back propagation algorithm; and
   migrating the parameters of the shared feature layer to a network framework comprising the shared feature extraction network and the plurality of sub-task networks.

11. The non-transitory storage medium of claim 10, wherein the method further comprises, before the testing phase:
   at a verification phase:
   inputting fourth facial images marked with the multi-dimensional label to the network framework after the training phase;
   collecting error samples, wherein the error samples are the fourth facial images corresponding to classification errors of the sub-task networks; and
   re-inputting the error samples to the network framework, and optimizing the parameters of each of the sub-task networks in order.

12. The non-transitory storage medium of claim 9, wherein supervision of each dimension of the multi-dimensional label on a respective one of the sub-task networks comprises: determining whether a second output result outputted by the respective one of the sub-task networks is the same as the each dimension of the multi-dimensional label; and calculating a cost value.

13. The non-transitory storage medium of claim 12, wherein a k-th dimension of the multi-dimensional label of a i-th first facial image is represented as:

$$y_i^{(k)} = \begin{cases} 1, k < yi \\ 0, k \geq yi \end{cases} y_i^{(k)} = \begin{cases} 1, k < yi \\ 0, k \geq yi \end{cases},$$

wherein $yi \in \{1, 2 \ldots K, K+1\}$, $k \in \{1, 2, 3 \ldots K\}$, and K is a total number of dimensions of the multi-dimensional label; during supervising, the cost value of the sub-task networks is shown as:

$$\text{cost}_k(y_i) = \begin{cases} k - yi + 1, yi \leq k \\ yi - k, yi > k \end{cases} \begin{cases} k - yi + 1, yi \leq k \\ yi - k, yi > k \end{cases};$$

the cost-sensitive loss function of the sub-task networks is: $L_k = -\cos t_k(y_i)(y_i^{(k)} \log \sigma(W^{(k)^y} X_i) + (1-y_i^{(k)}) \log(1 - \sigma(W^{(k)^y} X_i))$, wherein $W^{(k)}$ is a parameter of the facial beauty classification tasks, and $\sigma(x)$ represents a sigmoid function.

14. The non-transitory storage medium of claim 9, wherein the method further comprises:
   at the training phase:
   cyclically optimizing parameters of each sub-task network in order by using a back propagation algorithm.

15. The non-transitory storage medium of claim 14, wherein the method further comprises:
   optimizing parameters of the shared feature extraction network each time the parameters of one sub-task network are optimized.

* * * * *